United States Patent
Sussmeier

(10) Patent No.: US 6,237,746 B1
(45) Date of Patent: May 29, 2001

(54) BREAKAWAY PUSHER FOR A TIMING BELT OF A MAIL INSERTER

(75) Inventor: John W. Sussmeier, Cold Spring, NY (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/385,541

(22) Filed: Aug. 30, 1999

(51) Int. Cl.⁷ .................................................. B65G 19/26
(52) U.S. Cl. ........................................ 198/732; 198/728
(58) Field of Search .................................. 198/728, 731, 198/732

(56) References Cited

U.S. PATENT DOCUMENTS

| | | | |
|---|---|---|---|
| 1,224,379 | * 5/1917 | Honohan | 198/732 X |
| 2,236,747 | * 4/1941 | Cameron | 198/732 |
| 3,993,188 | 11/1976 | Muller | 198/461 |
| 4,147,252 | 4/1979 | Burkhardt | 198/732 |
| 4,446,962 | 5/1984 | Burkhardt | 198/457 |
| 4,997,081 | * 3/1991 | Sutin | 198/728 |
| 5,044,876 | 9/1991 | Stohlquist | 414/798.2 |
| 5,169,285 | 12/1992 | Muller | 414/797.8 |
| 5,174,559 | 12/1992 | Diamantides | 271/12 |
| 5,398,919 | 3/1995 | Suter | 270/58 |
| 5,806,659 | 9/1998 | Middelberg et al. | 198/731 |
| 5,820,334 | 10/1998 | Darcy et al. | 414/798 |
| 5,964,461 | * 10/1999 | Ende et al. | 198/732 X |

FOREIGN PATENT DOCUMENTS

| | | | |
|---|---|---|---|
| 1174818 | * 7/1964 | (DE) | 198/732 |
| 2459229 | * 7/1975 | (DE) | 198/732 |
| 310850 | * 9/1971 | (SU) | 198/732 |
| 1245517 | * 7/1986 | (SU) | 198/732 |

* cited by examiner

*Primary Examiner*—James R. Bidwell
(74) *Attorney, Agent, or Firm*—Michael J. Cummings; Christopher J. Capelli; Michael E. Melton

(57) ABSTRACT

A breakaway pusher for a timing belt used as part of a mailing machine. A split lug, having two halves, each with a hole, is affixed to the timing belt. A torsion spring having two legs and an eye, with one leg bonded to a surface of a pusher, is inserted between the two halves of the split lug, with the eye of the torsion spring aligned with the holes in the halves of the split lug. A pin is press fit into the holes of the two halves of the split lug, and pierces the eye of the torsion spring. The arrangement provides that when an obstruction prevents a collation of mail pieces from being moved forward by the timing belt and pusher, and the force preventing the conveying is transmitted by the collation to the pusher, the torsion spring will yield, allowing the pusher to rotate from a pushing position, in which it is perpendicular to the timing belt, to a breakaway position, in which it is substantially parallel to the timing belt and is able to ride under the collation and thereby avoid damaging the collation.

6 Claims, 3 Drawing Sheets

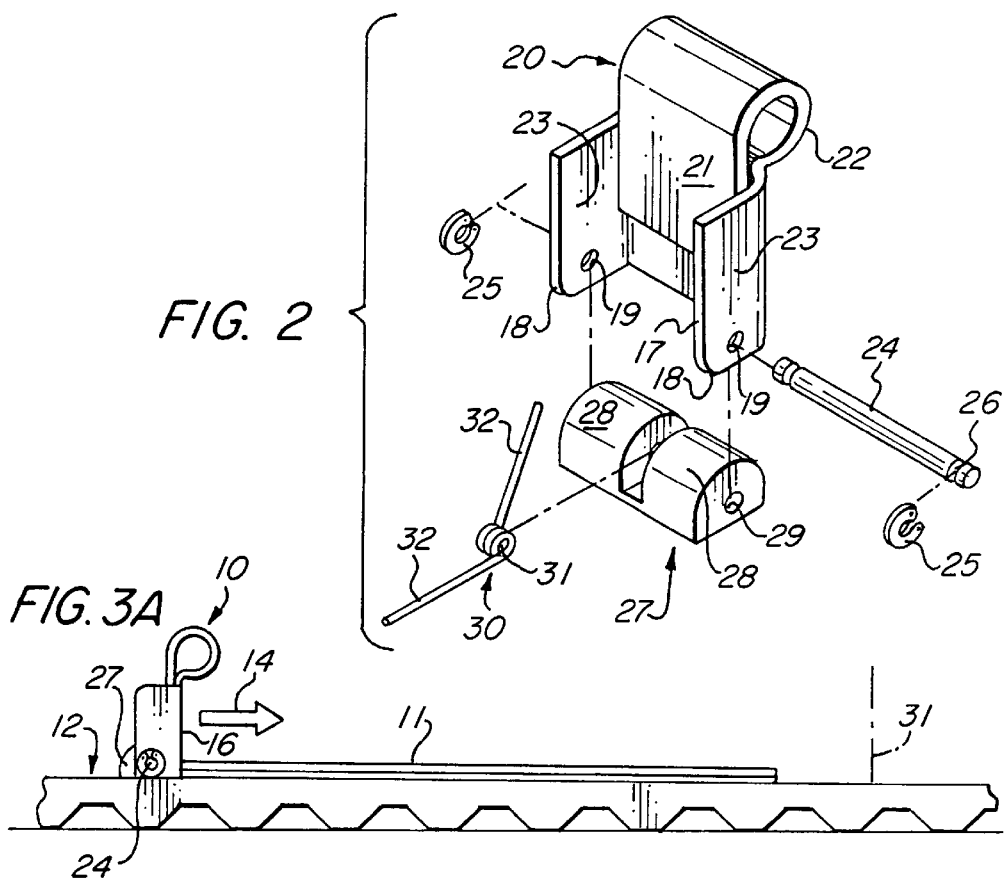
FIG. 2
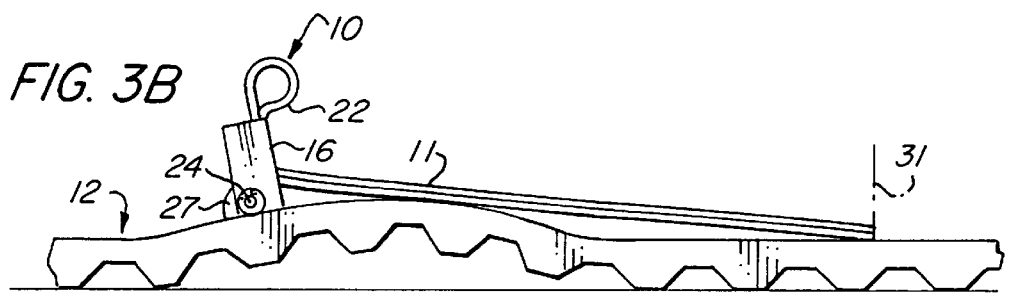
FIG. 3A
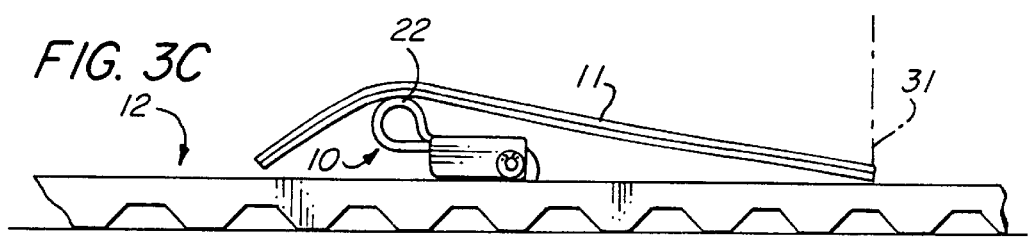
FIG. 3B
FIG. 3C

BREAKAWAY PUSHER FOR A TIMING BELT OF A MAIL INSERTER

BACKGROUND OF THE INVENTION

1. Technical Field

The present invention pertains to a mailing machine, and in particular to a pusher on a timing belt used as part of a mail inserter.

2. Description of Related Art

A mailing machine is equipment used to build up a mail piece from its components: the individual pages of the mail piece and its envelope. In the course of this building up process, several collated pages of a mail piece, called a collation, are conveyed by a conveyor between stations of the mailing machine. In a mail inserter type of mailing machine, as the collations are transported along the conveyor, they are eventually stuffed into an envelope. As a way of providing to the mailing machine a known position on the conveyor of at least one edge of each page of a collation, i.e. to provide edge registration, the upstream end of each collation is pushed by fingers protruding from the conveyor; these fingers are called pushers.

FIG. 1a shows part of a prior art inserter-type mailing machine, for document collating and stuffing. It includes a conveyor segment 41 formed by a pair of chains 42, 43, each chain trained about two sprockets 44, 45 and 46, 47 respectively. Each sprocket is secured to the end of a shaft 48, 49. Each of the chains 42, 43 has a plurality of pushers 51 extending outwardly from one of the chains 42, 43. Pairs of the pushers 51, one on each chain 42, 43, push documents 52 along the conveyor segment 41. In this prior art mailing machine, the documents 52 rest on a platform 53.

Sometimes, although a conveyor continues to turn so as to convey downstream its burden of collations, a jam or other situation obstructs the collations. The obstruction causes a jamming or backlogging of the collations. When a high speed mailing machine senses such a backlogging, it automatically performs a controlled halt. Although this halting may be performed rapidly, there is still a significant risk that some collations will be damaged by being forced against either the initiating obstruction itself or a secondary obstruction, one caused by the initiating construction.

What is needed is a way of pushing a collation along a timing belt so as to register the upstream end of the collation, but doing so with a mechanism that responds to a backward force exerted by the collation, in case of the collation encountering an obstruction, in such a way as to avoid damaging the collation.

SUMMARY OF THE INVENTION

Accordingly, the present invention provides a breakaway pusher for a timing belt of a mailing machine, the timing belt having a normal direction of travel and having an upper surface for conveying a collation, the breakaway pusher comprising: a pusher, having a back surface, the back surface facing opposite the normal direction of travel of the timing belt, and having a front surface for pushing a collation; and a device affixed to the timing belt for resiliently, rotatably holding the pusher in an orientation where its front surface is oriented so as to push a collation in the normal direction of travel of the timing belt; wherein the device for resiliently, rotatably holding the pusher yields to a force opposite to the normal direction of travel of the timing belt by allowing the back surface of the pusher to rotate downward toward the upper surface of the timing belt.

In particular applications of the invention, the device for resiliently, rotatably holding the pusher comprises a split lug, affixed to the upper surface of the timing belt, comprising two spaced apart halves, and, in some of these applications, a torsion spring, having a first leg and a second leg, and having an eye positioned between the two halves of the split lug, the first leg substantially parallel to and oriented in the direction opposite to the normal travel direction of the timing belt, and the second leg engaging the pusher and being substantially perpendicular to the timing belt when the torsion spring is not compressed, the torsion spring being oriented so that, in compressing, the second leg rotates so as to at least partially align with the first leg. In some applications, the constituent parts of the device are held together using a pin, extending through the two halves of the split lug and through the eye of the torsion spring.

BRIEF DESCRIPTION OF THE DRAWINGS

The above and other features and advantages of the invention become apparent from a consideration of the subsequent detailed description presented in connection with accompanying drawings, in which:

FIG. 2 is an enlarged, perspective view of the breakaway pusher of FIG. 1; and

FIGS. 3a–3c are a series of perspective drawings showing the response to a jam by the breakaway pusher.

BEST MODE FOR CARRYING OUT THE INVENTION

Figure 1A:
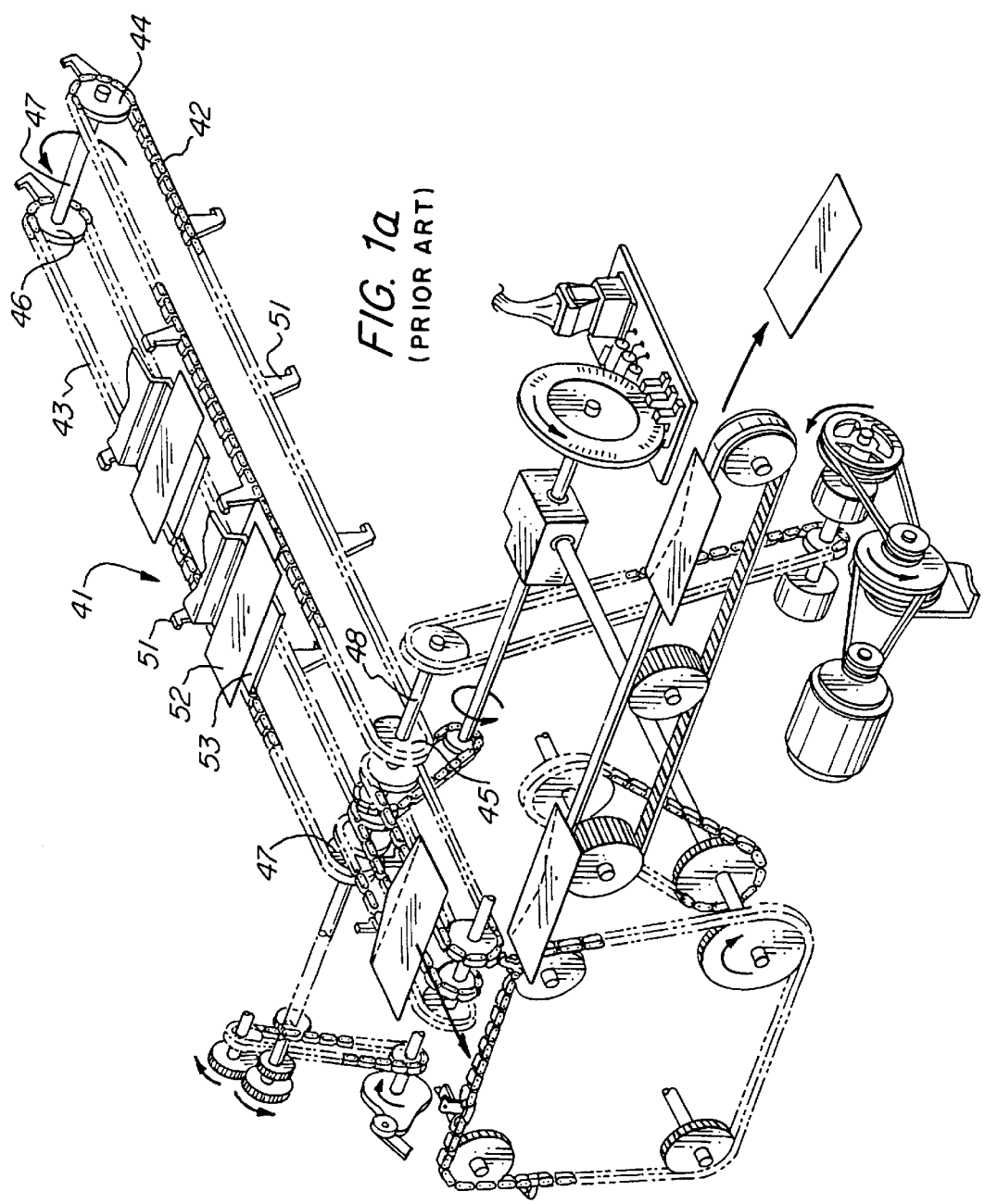
FIG. 1a shows a perspective view of part of a mail inserter with pushers according to the prior art.
Figure 1B:
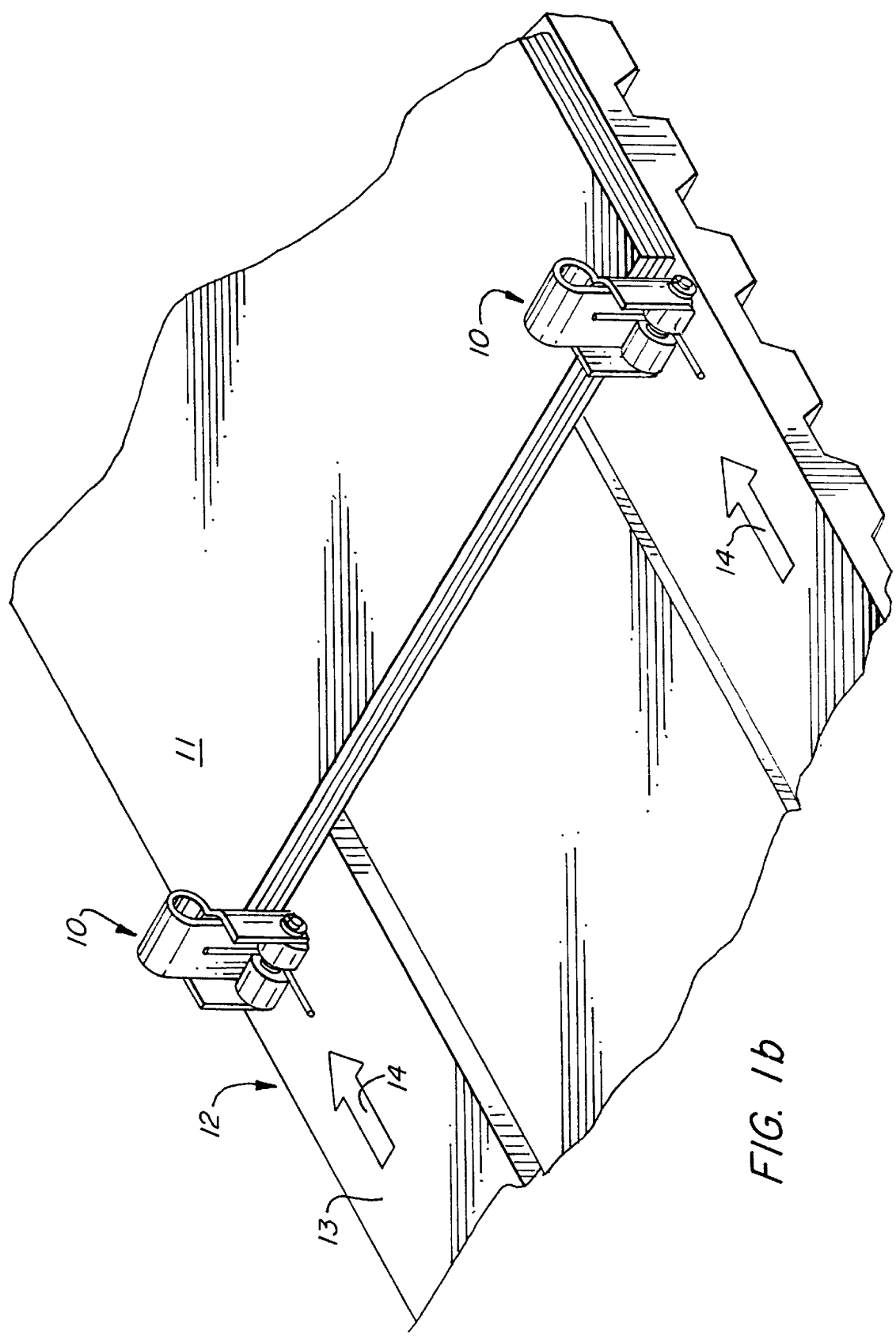
FIG. 1b shows a perspective view of a breakaway pusher, according to the present invention, affixed to a timing belt used in a mail inserter.

Referring now to FIG. 1b, breakaway pushers 10 according to the present invention are shown as part of a paper transport system used for assembling collations 11 in a mailing machine, such as an inserting machine where enclosures are being introduced. The breakaway pushers 10 are affixed to the outer surface 13 of a timing belt 12, serving as a conveyor, one pusher on either side of the timing belt outer surface. The direction of travel 14 of the collations 11 due to the motion of the timing belt 12 establishes a downstream direction, i.e. in the direction of travel, and an upstream direction, i.e. opposite the direction of travel Referring now to FIG. 2, a breakaway pusher 10 according to the present invention is shown in more detail as comprising a split lug 27 with halves 28 spaced apart so as to provide a cavity for inserting a torsion spring 30, having a torsion spring eyelet 31 and having two legs 32. The split lug is fastened, bonded or thermal-welded onto the outer surface 13 of the timing belt 12, which is preferably a urethane timing belt. The split lug itself is also preferably a urethane material.

The pusher structure 20, is preferably formed from a single piece of sheet metal. The pusher structure has two side walls 23 each having a pusher eyelet 19. The pusher structure is positioned over the split lug 27 so that the pusher eyelets 19 align with split lug eyelets 29. The torsion spring 30 is positioned in the cavity so that the torsion spring eyelet 31 is also aligned with the pusher eyelets 19, and so that one of torsion spring legs 32 lies along the timing belt surface 13, and the other points perpendicular and away from the surface. Pin 24 is then pressfit through the combination of eyelets and held in place by retaining nuts 25 placed over pin grooves 26 at each end of the pin 24.

Still referring to FIG. 2, the pusher structure 20 has a rounded fold 22, protruding out from a front face 16 (see FIG. 3), oriented to face the direction of travel 14. The rounded fold is made so that the surface facing the direction of travel has no crevices or irregularities that would cause a collation to catch on the surface. The rounded fold 22 is intended, in case of a jam, to reduce the risk that in knocking down the pusher structure 20, a collation will catch on the pusher structure. In many applications, depending on the sort of collations, such a rounded fold is not needed. In those applications, the pusher structure 20 has a substantially flat surface facing the direction of travel.

The pusher structure 20 also has side walls 23 that bend away from a plane having a normal along the direction of travel so as to face opposite the direction of travel. Each side wall has a rounded corner 18 that rests on the timing belt surface 12 farthest upstream on the side wall, and is given a radius preferably equal to the perpendicular distance from the center of an eyelet 19 to a side wall edge 17, thus providing that when the pusher structure 20 is knocked down, it rolls on the rounded corner 18 about the axis established by the eyelet 19 and extending through the pin 24 without lifting the pusher structure 20 from the timing belt surface 12.

Referring now to FIGS. 3a–c, the response of the breakaway pusher 10 to semi-rigid collations 11 colliding with a fixed barrier 31 and creating a jam is shown. In such a jam, the timing belt 12 continues to move under the fixed barrier 31, but the semi-rigid collation is stopped by the fixed barrier, and the force of the fixed barrier is transmitted to the upstream end of the collation so that it pushes against the front of the breakaway structure. Since the breakaway pusher 10 is affixed to the timing belt 12, and since the timing belt is flexible, the timing belt buckles in response to the jam. This buckling pushes the collations up on the front face 16 of the breakaway pusher 10, and is one of the forces of a couple causing the breakaway pusher to rotate about the pin 24, the other force of the couple being provided by the timing belt acting through the split lug 27 via the bond of the split lug to the timing belt.

So as to provide that the breakaway pusher will rotate down relatively soon in case of a jam, it is advantageous to have the axis about which the pusher rotates as it is knocked down (which is coincident with the axis of the pin 24) as close to the timing belt surface 13 as is practical. In the preferred embodiment, this distance is 0.0625".

Instead of fabricating the pusher structure out of sheet metal, it is also possible to mold the pusher structure out of any material that will provide a hard smooth surface against which the edges of a collation may push without catching. For example, the pusher structure could be molded from a hard plastic, or a metal. Alternatively, the pusher structure could be a composite system in which only the front face 16 of the pusher is made out of a hard material; the hard front face would be affixed to the rest of the pusher structure 20, which could be made out of various materials, not necessarily providing a hard smooth surface. The only requirements on the materials out of which the rest of the pusher structure would be made are that they have sufficient strength for allowing the pin 24 to be pressfit through eyelets 19, and for rotating about the pin without any appreciable wear for an appropriate number of duty cycles, preferably 10,000.

The torsion spring 30 should be sized to provide an appropriately small restoring force. It is desirable that the spring be easily compressed (i.e. deformed so that the two torsion spring legs 32 are mutually parallel) and yet be able to return to the original uncompressed state for an appropriate number of duty cycles, preferably 10,000. The spring should compress with a force as little as 1/10 of a pound (approximately 0.45 Newtons). If the restoring force is significantly less that this, then the breakaway pusher will partially fall down as the timing belt accelerates, from time to time, in normal operation.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A conveyor of a mailing machine comprising:

a timing belt having a normal direction of travel, the timing belt having an upper surface for conveying a collations; and a breakaway pusher comprising a pusher, having a back surface, the back surface facing opposite the normal direction of travel of the timing belt, and having a front surface for pushing a collation; and means affixed to the timing belt for resiliently, rotatably holding the pusher in an orientation where its front surface is oriented so as to push a collation on the upper surface of the timing belt in the normal direction of travel of the timing belt;

wherein the means for resiliently, rotatably holding the pusher yields to a force from the collation opposite to the normal direction of travel of the timing belt by allowing the back surface of the pusher to rotate downward toward the upper surface of the timing belt, and allowing the pusher to pass under the collation.

2. A breakaway pusher for a timing belt of a mailing machine, the timing belt having a normal direction of travel, the timing belt having an upper surface for conveying a collation, the breakaway pusher comprising:

a) a pusher, having a back surface the back surface facing opposite the normal direction of travel of the timing belt, and having a front surface for pushing a collation, and b) means affixed to the timing belt for resiliently, rotatable holding the pusher in an orientation where its front surface is oriented so as to push a collation in the normal direction of travel of the timing belt, wherein the means for resiliently, rotatably holding the pusher yields to a force opposite to the normal direction of travel of the timing belt by allowing the back surface of the pusher to rotate downward toward the upper surface of the timing belt; and wherein the means for resiliently, rotatably holding the pusher comprises a split lug, affixed to the upper surface of the timing belt, comprising two spaced apart halves.

3. The breakaway pusher as in claim 2, wherein the means for resiliently, rotatably holding the pusher further comprises a torsion spring, having a first leg and a second leg, and having an eye positioned between the two halves of the split lug, the first leg substantially parallel to and oriented in the direction opposite to the normal travel direction of the timing belt, and the second leg engaging the pusher and being substantially perpendicular to the timing belt when the torsion spring is not compressed, the torsion spring being oriented so that, in compressing, the second leg rotates so as to at least partially align with the first leg.

4. The breakaway pusher as in claim 3, wherein the means for resiliently, rotatably holding the pusher further comprises a pin, extending through the two halves of the split lug and through the eye of the torsion spring.

5. The breakaway pusher as in claim 4, wherein the pusher front surface has a rounded fold protruding in the normal direction of travel.

6. A breakaway pusher for a timing belt of a mailing machine, the timing belt having a normal direction of travel, the timing belt having an upper surface for conveying a collation, the breakaway pusher comprising:

a) a split lug, affixed to the upper surface of the timing belt, comprising two spaced-apart halves;

b) a torsion spring, having a first leg and a second leg, and having an eye positioned between the two halves of the split lug, the first leg substantially parallel to and oriented in the direction opposite to the normal travel direction of the timing belt, and the second leg engaging the pusher and being substantially perpendicular to the timing belt when the torsion spring is not compressed, the torsion spring being oriented so that, in compressing, the second leg rotates so as to at least partially align with the first leg;

c) a pusher, having a back surface, the back surface facing opposite the normal direction of travel of the timing belt and being rigidly attached to the distal end of the second torsion spring leg; and d) a pin, extending through the two halves of the split lug and through the eye of the torsion spring.

* * * * *